United States Patent [19]
Fong

[11] Patent Number: 4,839,455
[45] Date of Patent: Jun. 13, 1989

[54] ONE PART MOISTURE CURABLE URETHANE COMPOSITION

[75] Inventor: James J. Fong, Woodbury, Minn.

[73] Assignee: Minnesota Mining and Manufacturing Company, St. Paul, Minn.

[21] Appl. No.: 90,859

[22] Filed: Aug. 28, 1987

[51] Int. Cl.$^4$ .............................................. C08G 77/00
[52] U.S. Cl. ..................... 528/28; 525/453; 524/869; 528/18; 528/21
[58] Field of Search .................. 528/28; 525/453; 524/869

[56] References Cited

U.S. PATENT DOCUMENTS

| | | | |
|---|---|---|---|
| 4,217,436 | 8/1980 | Richter et al. | 528/45 |
| 4,222,909 | 9/1980 | Brixius et al. | 260/18 |
| 4,289,869 | 9/1981 | Zengel et al. | 528/73 |
| 4,507,447 | 3/1985 | Yamazek et al. | 528/28 |
| 4,539,345 | 9/1985 | Hansen | 523/219 |
| 4,565,857 | 1/1986 | Grant | 527/301 |
| 4,600,790 | 7/1986 | Eck et al. | 556/421 |
| 4,625,012 | 11/1986 | Risk et al. | 528/28 |

Primary Examiner—John C. Bleutge
Assistant Examiner—Ralph H. Dean, Jr.
Attorney, Agent, or Firm—Donald M. Sell; Walter N. Kirn; Richard Francis

[57] ABSTRACT

The present invention relates to one-part, moisture-curable, urethane compositions suited as a coating for wood. The composition comprises trisocyanate prepolymer, an epoxy silane, and compatible solvent.

6 Claims, No Drawings

ONE PART MOISTURE CURABLE URETHANE COMPOSITION

BACKGROUND OF THE INVENTION

This invention relates to a one-part moisture-curable urethane composition, a method of providing a protective coating by application of the composition to a substrate, and to substrate such as wood coated therewith.

Coatings containing polyurethane are very popular because they provide a clear coating on wood which has flexiblity, thoughness, abrasion resistance, and chemical resistance. The polyurethane coating may be either a two-component or a one-component system. The two-component systems are genrally inconvenient to use because they have a short pot life and are difficult to apply. The use of two-component systems as a wood finish is thus generally limited to professionals.

The one-component, moisture-cureable polyurethane systems are well known as clear wood finishes. One type, the isocyanate modified drying oil or urethane oil, depends for its final curing upon the oxidative polymerization of double bonds of the drying oil fatty acid portion. Another type, the so-called blocked isocyanate coating system, involves the heat curing of an end-capped isocyanate which is blocked by phenol or ketoxime that is curable with a polyol via thermal regeneration of the isocyanate.

U.S. Pat. No. 4,222,909, issued to D. W. Brixius et al, discloses a moisture curable coating composition comprising low molecular weigh isocyanate functional acrylic polymer having a terminal thioalkyl group based on the copolymerized isocyanatoalkyl methacrylate. U.S. Pat. No. 4,217,436, issued to Richter et al, discloses the use of a novel bis cyclic urea blend with polymeric polyols to form one-component room temperature stable curable composition. The bis cyclic urea is easily converted to aliphatic diisocyanate simply by heating. U.S. Pat. No. 4,565,857, issued to Grant, discloses a protective coating system comprising a polymerizable ethylenically unsaturated compound having an isocyanate group reacted with the hydroxyl groups of the celluose ester. This thermoplastic polymer can be coated on a wood surface by conventional methods and, following a final cure, thermoset by exposure to ultra violet light. U.S. Pat. No. 4,600,790, issued to Eck et al discloses a moisture curable composition containing SiC-bonded biuret groups, which is prepared by reacting amino functional silane with mono or diisocyanates, that serves as an additive to lacquers. U.S. Pat. No. 4,289,869, issued to Zengel et al, describes a moisture curable mixture containing polysocyanate and polyepoxide with an N,N'-substituted imidazolidine or hexahydropyrimidine derivative as a moisture activated hardener. U.S. Pat. No. 4,625,012, issued to Risk et al, discloses the preparation of a moisture curable polyurethane polymer containing terminal socyanate and alkoxysilane by a two-step reaction route, to provide a sealing material for non-porous surfaces such as glass and ceramic. U.S. Pat. No. 4,539,345, issued to Hansen, teaches one-part moisture-curable polyurethane adhesive, coating, sealant, or casting compositions based on a blend of isocyanate-functional prepolymer, terpenephenolic resin, and a silane compound.

The polyurethane coating compositions disclosed in the cited prior art have problems or disadvantages. For example, the cellulose-type urethane coatings lack the ability to provide heat and stain resistance, oil-type urethane systems require the use of heat and UV radiation for curing, polymerizable isocyanate-silane polymers have a relatively short pot life due to high molecular weight, and some coatings are complicated to use and/or are relatively expensive to prepare because they use sophisticated materials. Many of these disadvantages can be overcome by the present invention.

SUMMARY OF THE INVENTION

The present invention provides a one-part, moisture-curable composition that comprises triisocyanate prepolymer, an amount of epoxy silane effective to crosslink the prepolymer, and sufficient compatible liquid vehicle to make the composition suitable for application.

Preferred prepolymers are selected from the group consisting of a reaction product of a diisocyanate and a triol and 1,3,5-triazine. The diisocyanate may be aromatic or aliphatic, but is preferably apliphatic, if yellowing associated with the aromatic is a concern. Blends of triisocyanate prepolymer with diisocyanate prepolymer are also preferred since the presence in the coating of diisocyanate tends to enhance the flexibility of the cured coating. Preferred prepolymer blends may be obtained by reaction of diisocyanate with trimethylol propane and 1,3-butandiol. Preferred isocyanates are toluene 2,4-diisocyanate and aliphatic isophorone diisocyanate.

The epoxy silanes used in the present invention are characterized by having a silicon atom having trialkoxy functionality and an epoxy group. Such epoxy silanes are very stable, even when mixed with the isocyanate prepolymer, so long as the other components are free of active hydrogen atoms. The epoxy silane is thought to hydrolyze to hydroxy and then crosslink with triisocyanate to form a coating. Preferred epoxy silanes are selected from the group consisting of gamma glycidoxypropyltrimethoxy silane and beta-(3,4-expoxycylohexyl) ethyltrimethoyloxy silane.

The composition of the invention may include a catalyst to accelerate cure time, but such catalysts are not required since the cure times of compositions without the catalyst are quite adequate for most applications. Useful catalysts include stannous octoate and dibutyl tin dilaurate. Any compatible liquid vehicle may be used in the practice of the invention. Useful liquid vehicles are solvents which are free of active hydrogen atoms and moisture.

The composition of the invention may be used by a method which has the following steps:

(a) preparing the surface of a substrate surface for treatment, if needed, usually by conventional methods;

(b) applying the composition to the surface; and (c) subjecting the coating applied in (b) to conditions which facilitate the cure of the composition.

Application may be by any of a variety of methods such as brushing, spraying and wiping. Since the composition has a high solids content and low viscosity it may be easily applied in a "wipe-on" application to wood surfaces as a very quick, convenient, and precise method preferred by the do-it-yourself consumer.

This invention provides many advantageous features. It provides a coating composition which has an extremely stable shelf-life, low viscosity and high solids content to facilitate easy application. The coating exhibits excellent hardness, good adhesion to wood surfaces and other non-porous or porous surfaces such as ceramic, cement, etc., good stain and chemical resistance, and heat resistance.

The coating composition of the invention is particularly useful to treat wood in the consumer market to provide a clear finish. The composition of the present invention provides considerable improvement over commercially available products which are based upon cellulose, urethane oil and thermoplastic urethane. The present composition also has excellent penetration into the pores of wood and other porous materials and develops excellent bonding with wood cellulose and other surfaces. Once treated, a wood surface is provided with an excellent durable finish, highlighting the wood grain. The treated wood surface feels waxy and smooth, but not greasy. The treated surface is easy to clean, and has a high resistance to food stains, household chemicals, and damage caused by contact with hot items.

The applied compostion typically exhibits high gloss, but it may be altered by the addition of conventional flattening agents. Pigment such as dried $TiO_2$, ZnS, can also be added to provide a sealant that bonds well to ceramic, glass and concrete surfaces.

The composition also has a shorter drying time to a sandable condition than other known commercial products which allows users to apply multiple coatings within a shorter time. The applied composition has excellent weatherability, showing less discoloration as well as less wood grain raising.

DESCRIPTION OF THE INVENTION

In the practice of the present invention, the moisture curable compositions can be reacted with atmospheric or added moisture to produce a crosslinked polyurethane coating or sealant. The triisocyanate-functional prepolymer (hereafter sometimes referred to as the "prepolymer") contains sufficient isocyanate groups to enable the composition to be crosslinked by the epoxy silane upon exposure to atmospheric or added moisture.

The amount of silane compund preferably is adjusted to provide desired handling characteristics before cure and a desired level of adhesion (measured initially and after exposure to environmental conditions) after cure. This amount will vary depending upon the particular prepolymer employed, the other ingredients present in the composition, and the substrate and environmental conditions with which the composition will be used. In general, an effective amount of silane compound is an amount which will provide coherent protective coating of the composition when it is applied to a substrate with substantially no unreacted starting materials. Expressed numerically, a preferred amount fo silane compound is about 0.1 to 25 parts by weight of silane compound per 100 parts of prepolymer, more preferably about one to 10 parts of silane compound per 100 parts of prepolymer.

The triisocyanate prepolymers used in the present invention are commercially available from National Lead Chemicals, Highstown, N.J. The compositions and the structures of these prepolymers are described as follows:

where A is a backbone consisting of at least three —$CH_2O$— groups derived from polyhdric alcohols, such as glycerol, trimethylol propane, penataerythritol, dipentaerythritol, sorbitol, or inositol. B is a moiety consisting of urethane (—COHN—) linkage to an aliphatic or aromatic segment, e.g., derived from diisocyanates such as cyclohexyl diisocyanate, isophorone diisocyanate, hexamethylene diisocyanate, if aliphatic, and 2,4, toluene diisocyanate, 4,4'-diphenylmethane diisocyanate, 4,6'-xylylene diisocyanate, if aromatic.

The prepolymer is usually prepared as a solution with a suitable solvent. Some examples of useful prepolymer solutions include the following. It should be noted that the solids content and the particular solvent is given for illustrative purposes and both the solids content and the solvent may be changed depending upon the needs of the user.

Prepolymer Solution A

This is a solution of an aromatic prepolymer which is a reaction product of trimethylol propane (TMP) with 3 moles of toluene diisocyanate (TDI). The isocyanate prepolymer structure is as follows:

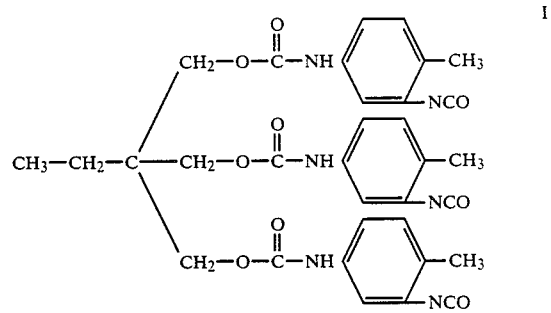

The solution contains 60% solids of the isocyanate and 40% methoxy propyl acetate as solvent. The prepolymer solution has an available NCO content of 10% by weight.

Prepolymer Solution B

Prepolymer Solution B is a solution of a blend of prepolymers which are the mixed reaction products of trimethylol propane and 1,3-butandiol with toluene diisocyanate (TDI). The reaction product structure are as follows.

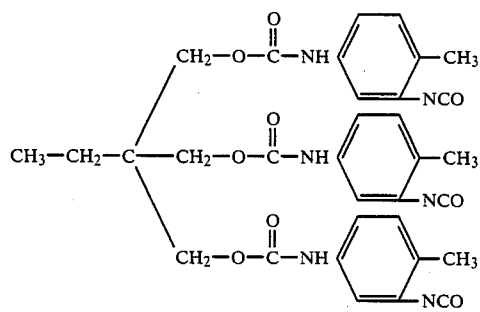

II

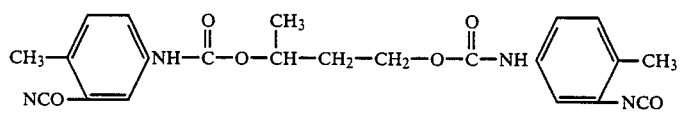

III

Prepolymer Solution B contains 75% solids as a blend of the two polyisocyanates at a molar ratio of II:III of 2:1, and 25% methyl ethyl ketone as solvent. The available NCO content is 12.5% by weight.

Prepolymer Solution C

Prepolymer Solution C is a solution of a blend of prepolymer rection products of trimethoyl propane (TMP) and 1,3-butandiol with isophorone diisocyanate (IPDI). The reaction products have the following structures.

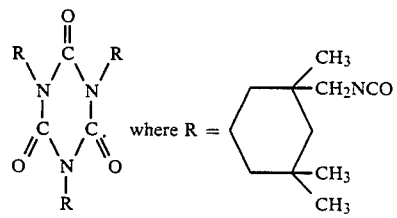

VI

This solution had a solids content of 70% by weight,

IV

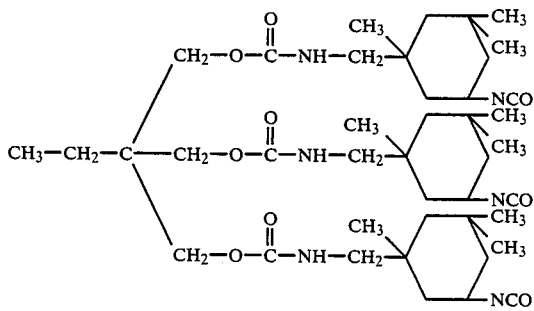

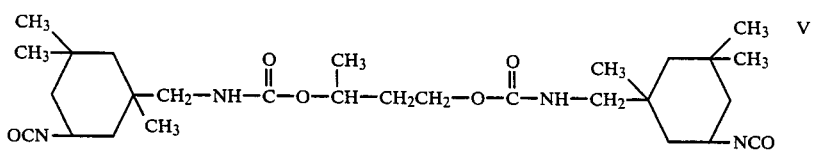

V

Prepolymer Solution C contains 60% solids of the blend in a molar ratio of IV to V of 2.1:1, and 40% 50/50 methoxy propyl acetate/xylene as solvent. The available NCO content is 7.5% by weight.

Prepolymer Solution D

Prepolymer Solution D is the same as Prepolymer Solution C except the ratio of IV to V is 1.7:1, it has an available NCO of 8.8% by weight, and it contains 65% solids and 35% 50/50 methoxy prppyl acetate/toluene as solvent.

Prepolymer Solution E

Prepolymer Solution E is a solution of a trimer of isophorone diisocyanate prepolymer, having the following formula.

an NCO content of 10.2% by weight and 50/50 by weight methoxy propyl acetate/xylene solvent.

The prepolymers typically have relatively low molecular weights, i.e., from about 400 to about 800. The branched triisocyanate in the polymer structure plays an important role in controlling the degree of crosslinking in curing process. The diisocyanate prepolymer can be considered as a modifier that adds more linear chains to provide a more flexible coating.

The prepolymers used in the invention are preferably substantially free of the reactants such as unreacted toluene 2,4-diisocyanate and isophorone diisocyanate, which have a relatively high vapor pressure and may be somewhat toxic.

The epoxy silane compund is preferably sufficiently free of active hydrogen-containing functional groups which could cause premature gelation of the prepolymer when combined therewith. Thus, epoxy silanes containing hydroxy, mercapto, amino, ureido functional groups are not suitable because they contain undesirable reactive groups. Preferably, the epoxy silane compound contains one or more alkoxy groups, e.g., methoxy or ethoxy, with methoxy groups being most preferred.

The epoxy silane is characterized by having a polymerizable (preferably terminal) epoxy group and a polymerizable silane group. These groups are connected by a linking moiety which is free of functional groups which will hydrolyze in the presence of the prepolymer. This linking moiety may be aliphatic or aromatic or be formed of both aliphatic and aromatic moieties. The linking moitey may contain nitrogen although it is preferably free of nitrogen atoms. The linking moiety may contain oxygen atoms which are typically within the molecule as ether linkages and most preferably are present only adjacent to the epoxy group. The linking moiety may be substituted, as is well known in the art, so long as the substitution does not greatly affect the ability of the epoxy-terminated silane to cross link the prepolymer. Example substituents which may be included in the linking moiety include $NO_2$, alkyl [e.g., $-CH_2(CH_2)_nCH_2-$ where n is from 0 to 20], alkoxy (e.g., methoxy), halogen, etc.

Preferred epoxy silanes useful in the practice of this invention are compounds of general formulae:

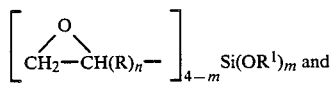

VII

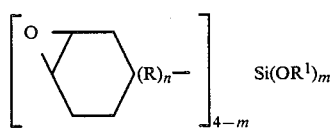

VIII where R is a divalent hydrocarbon radical (aliphatic, aromatic, or mixed aliphatic-aromatic containing) of less than 20 carbon atoms or a divalent radical of less than 20 carbon atoms consisting of carbon, nitrogen, sulfur and oxigen atoms, with the oxygen atoms present as ether linkages and with no two heteroatoms being adjacent within the backbone of the divalent hydrocarbon radical.

More preferred epoxy silanes are represented by the following formulae.

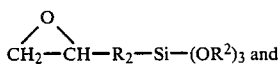

IX

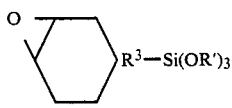

X wherein $R^3$ is a non-hydrolyzable divalent hydrocarbon radical of fewer than 20 carbon atoms or a divalent group of fewer than 20 carbon atoms and backbone of which is composed of only carbon, nitrogen, sulfur and oxygen atoms with no two adjacent heteroatoms, and $R^2$ is an aliphatic hydrocarbon group (e.g., alkyl) or acyl group of fewer than 10 carbon atoms.

In the epoxy silane compostions of formulae VII-X, n is from 0 to 1, m is 1 to 3, R may be any divalent hydrocarbon radical such as methylene, ethylene, decalene, phenylene, cyclohexylene, cyclopentyle, methylcyclohexylene, 2-ethylbutylene, and allene or an ether radical such as $-CH_2-CH_2-O-CH_2-CH_2-$, $-(CH_2CH_2O)_2-CH_2-CH_2-$, $-O-CH_2-CH_2-$, and $-CH_2O-(CH_2)_3-$. $R^1$ can be any aliphatic hyydrocarbon radical of less than 10 carbon atoms such as methyl, ethyl, ispropyl, butyl, vinyl, alkyl, or any acyl radical of less than 10 carbon atoms such as formyl, acetyl, propionyl, or any radical of the formula $(CH_2CH_2O)_kZ$ in which k is an integer of at least 1, and Z is hydrogen.

The most preferred epoxy silanes are those represented by the formulae:

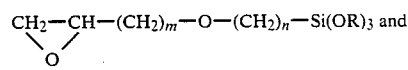

XI

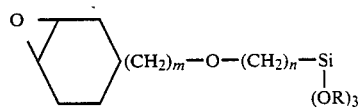

XII wherein R is an alkyl group fo up to 6 carbon atoms, and m and n are independently 1 to 6.

Catalysts in the present invention are generally used in the amounts of from 0.01 to 5% by weight of the rective ingredients in the curable composition. Preferably in the range of 0.05 to 1.0% by weight. The most preferably catalysts are dibutyl tin dilaurate and tin octoates. Other useful catalysts include triethylene diamine, dimethyl piperazine, bis[2-(2-N,N -dialkylamino)-alkyl] ethers and dimorpholino kialkyl ethers, and other urethane-forming catalysts known to those skilled in the art.

Suitable solvents used in this invention are generally free of active hydrogen. Examples of useful solvents include ketones (such as acetone, methyl ethyl ketone, methyl isobutyl ketone, methyl isoamyl ketone), aromatics (such as benzene, toluene, and xylene), acetates (such as ethyl acetate, methoxy propyl acetate, dipropylene glycol methyl ether acetate) and chlorinated solvents (such as 1,1,1 trichloroethane). The preferred solvents are methoxy propyl acetate, methyl isobutyl ketone, toluene and the blend of these. The range of solvent content can be from about 0 to about 95% by weight, depending upon different prepolymer and silane formulations used. The preferred solvent content is from 20 to about 80% by weight.

There are a number of different additives that may be incorporated into the coating composition of the invention for various purposes. A flattening agent such as fine silica may be used or conventional purposes to change the gloss and shine of the coating. Useful silica flattening agents are porous particulate materials with a pore volume of about 0.4 to 4.0 milligrams, and particle size of about 3 to 15 μm. The preferred weight percent of flattening agents in the composition is from 1.0% to 3.0% by weight depending on the gloss desired.

Other filler materials sucha as, $TiO_2$, ZnS, carbon black, and glass bubbles (such as those described in U.S. Pat. No. 3,365,315) may be added for reinforcement, to reduce density, and/or cost. The filled formulae provide sealant compositions to coat ceramic, glass, and cement.

Coloring agents, including organic dye and inorganic pigments, may be incorporated into the composition of the invention to form compositions which can stain and finish a substrate. These materials are, for example, metallic azo dyes, organic dyes (such as phthalocyanine dye and perylene dye) and inorganic pigments (such as ferric oxide and chromum yellow). The weight percent of such additives is preferably from 1% to about 90% of the total solids. Other conventional additives may also be added.

The coating composition is preferably packaged in conventional containers used for this purpose such as metal cans or containers made of high density polyethylene, nylon-coated polyethylene, polytetrafluoroethylene-coated polyethene, or in a sealed pouch made of a laminate of polythylene and aluminum foil. The coating composition may include a suitable aerosol propellant and be packaged in a spray can, or in a conventional can for brush or "wipe"on" application.

The compositions of the invention are cured by exposure to water, e.g., water vapor or moisture. Ambient humidity usually is adequate to promote cure. Heat or high humitidy will accelerate cure, and low temperatures (e.g., 5° C. or less) or low humidity (e.g., 15% R. H. or less) will retard cure.

Reference to the following examples will provide further understanding of the present invention. All parts are by weight, unless otherwise stated.

EXAMPLES 14 15

Examples 1-15 demonstrate the use of different prepolymers and silanes in a 1:1 molar ratio of available NCO in prepolymer to in the silanes in comparison with the use of prepolymer alone. The composition of Examples 1-15 is given in Table I. Curing time was recorded for 3 drops of a test formulation on glass surface until a tack-free condition was reached under ambient laboratory conditions.

The physical property testing was accomplished by the following procedures. Hardness was measured by ASTM Pencil Hardness Test D3363-74 (1980) to determine the degree of crosslinking and mar resistance.

Stain resistance involved the application of four different types of stain to the surface being tested. The types of stains were as follows:

(a) Blue-dyed ethanol-water solutions with an ethanol concetraion of 80%, 70%, and 60%, respectively, each solution containing 0.2% of a dye which is commercially available as Sandan Blue E-HRL (from Sandoz Colors and Chemicals).

(b) Fingernail polish commercially available from Revlon Inc, New York, New York as BLAZE OF RED 55 and which was composed of a mixture of butylacetate, ethylacetate, toluene, ispropyl alcohol, resins and pigments.

(c) Marking pen commercially available as Berol Marker 8800 (red color), which contained a red coloring material dissolved in organic solvents.

(d) Shoe polish commercially available from KIWI as Black Liquid Wax which was thought to contain hydrocarbon solvent, resins and wax.

These household items were selected because they are common items which often cause staining problems. The stains were applied to the test coating which had been coated on a wood (e.g., maple, oak, etc.) block, after the test coating had dried. After being permitted to dry, the stains were removed by wiping with a cheese cloth soaked eith acetone or fingernail polish remover. The surface condition of the test coating was then rated on a scale from 1 to 5, according to the following criteria:

1—coating was stripped during stain removal or stain penetrated deeply to coating;
2—coating was discolored or stain partially remains;
3—stain remained weakly visible in coating;
4—stain remained vaguely visible in coating; and
5—surface unchanged from condition priot to staining.

The heat resistance thest envolved the use of a 2 ¾ (6.9 mm) diameter 3 inch (7.5 mm) high stainless steel cylinder weighing 5 lbs (2.27 kg) which was heated in oven at 152° C. for 15 minutes. The block was quickly removed from the oven and placed on its circular end onto a test coated surface which had previously been covered with one layer of cheese cloth, maintaining the cylinder on the surface for 30 minutes. After removal of the cylinder and cheese cloth, the coating was observed and rated from 1 to 5 according to the following criteria:

1—heavy discoloration and marking;
2—heavy discoloration or marking;
3—light discoloration and marking;
4—light discoloration or marking; and
5—no change from original surface.

Overall stain and heat resistance results, shown in Table II, reveal that coatings accordding to the invention which contain prepolymer and silane have better performance than coatings made with the prepolymer alone.

TABLE I

| EXAMPLE NO. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Prepolymer A[1] | 50 | 50 | 50 | | | | | | | | | | | | |
| Prepolymer B | | | | 50 | 50 | 50 | | | | | | | | | |
| Prepolymer C | | | | | | | 50 | 50 | 50 | | | | | | |
| Prepolymer D | | | | | | | | | | 50 | 50 | 50 | | | |
| Prepolymer E | | | | | | | | | | | | | 50 | 50 | 50 |
| $\gamma$-glycydoxylpropyl trimethoxysilane | | 17 | | | 26.4 | | | 12.7 | | | 16.6 | | | 23.7 | |
| $\beta$-(3.4-epoxycyclohexyl) ethyltrimethoxysilane | | | 16 | | | 25.3 | | | 12.2 | | | 16 | | | 22.7 |
| Dibutyltin dilaurate | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| 25/75 MIBK[2]/toluene | 50 | 50 | 50 | 50 | 50 | 50 | 50 | 50 | 50 | 50 | 50 | 50 | 50 | 50 | 50 |
| Molar ratio NCO in prepolymer/silane | — | 1.0 | 1.0 | — | 1.0 | 1.0 | — | 1.0 | 1.0 | — | 1.0 | 1.0 | — | 1.0 | 1.0 |

TABLE I-continued

| EXAMPLE NO. | COMPOSITION (PARTS) | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Curing time (mins) | 110 | 100 | 100 | 160 | 140 | 140 | 180 | 180 | 180 | 110 | 100 | 100 | 150 | 150 | 180 |

Footnotes:
[1] Prepolymer designations refer to previously described prepolymer solutions.
[2] Methyl isobutyl ketone

TABLE II

| Example No. | PHYSICAL PROPERTIES[1] | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| PENCIL HARDNESS | | | | | | | | | | | | | | | |
| 16 Hours | <H | 2H | 2H | <H | 1-2H | 2-3H | H | 1-2H | H | >H | H | 2H | >H | H | H |
| 1 Week | 2H | 4-5H | 4-5H | H | 4H | 4H | 3H | 4H | 4H | >H | 3H | 4H | >H | 3H | 3H |
| STAIN RESISTANCE RATING | | | | | | | | | | | | | | | |
| $C_2H_5OH$ resistance | | | | | | | | | | | | | | | |
| 80% | 3.0 | 5.0 | 4.5 | 1.0 | 5.0 | 5.0 | 1.0 | 3.0 | 3.0 | 1.0 | 5.0 | 4.0 | 1.0 | 3.0 | 4.0 |
| 70% | 3.5 | 5.0 | 4.5 | 1.0 | 5.0 | 5.0 | 1.0 | 3.0 | 3.0 | 1.0 | 3.5 | 4.0 | 1.0 | 3.5 | 5.0 |
| 60% | 4.0 | 5.0 | 5.0 | 1.0 | 5.0 | 5.0 | 1.0 | 3.0 | 3.0 | 1.0 | 3.5 | 3.5 | 1.0 | 3.5 | 5.0 |
| Fingernail Polish | 3.0 | 5.0 | 4.0 | 1.0 | 5.0 | 4.5 | 1.0 | 5.0 | 5.0 | 1.0 | 5.0 | 4.0 | 1.0 | 3.5 | 3.5 |
| Permanent Marker | 3.0 | 5.0 | 4.0 | 1.0 | 5.0 | 4.0 | 2.0 | 5.0 | 5.0 | 1.0 | 5.0 | 4.0 | 1.0 | 5.0 | 4.0 |
| Shoe Polish | 2.0 | 4.0 | 5.0 | 1.0 | 5.0 | 5.0 | 3.5 | 4.0 | 4.0 | 1.0 | 5.0 | 5.0 | 3.0 | 4.0 | 5.0 |
| HEAT RESISTANCE RATING | | | | | | | | | | | | | | | |
| 5-6 days after coating | 1 | 4 | 4 | 4 | 4 | 5 | 2 | 3 | 3 | 2 | 4 | 4 | 1 | 3 | 4 |

Footnotes:
[1] all coatings applied to a laminated veneer oak panel, two coats by brush, to provide a dry thickness of about 50 to about 90 micrometers.

EXAMPLE 16

This example demonstrates the chemical stability of the one-componet, moisture-curable composition according to the invention. A coating formulation was prepared using 63 parts of Prepolymer Solution A, 21 parts of gamma-glycydoxy propyl trimethoxysilane, 63 parts of toluene, and 0.25 part of dibutyltin dilaurate. The solution was divided into two parts. One part was kept as a control and the other part was aged by heating at 60° C. for 72 hours. Both samples were analyzed by nuclear magnetic resonance spectrometey and infrared spectrometry and found to have the same molar ratio of active ingredients.

EXAMPLES 17-26

Comparative Examples 17-26, described in Table III, were prepared to demonstrate the useful range of the two active ingredients used in terms of weight ratio and molar ratio. The test data shwon in Table IV shows that optimum performance is at a 1/1 molar ratio and 3/1 weight ratio of prepolymer to silane, and that the preferred range is from 10/1.0 to 1.0/1.0 (weight ratio) and from 3.37/1.0 to 0.34/1.0 (molar ratio).

TABLE III

| Example No. | COMPOSITION (PARTS) | | | | | | | | | |
|---|---|---|---|---|---|---|---|---|---|---|
| | 17 | 18 | 19 | 20 | 21 | 22 | 23 | 24 | 25 | 26 |
| Prepolymer A[1] | 42.78 | 42.78 | 42.78 | 42.78 | 42.78 | 42.78 | 42.78 | 42.78 | 42.78 | 39.94 |
| γ-glycidoxypropyl trimethoxysilane | — | 4.28 | 5.35 | 6.03 | 8.56 | 10.70 | 14.26 | 21.39 | 42.78 | 59.90 |
| Dibutyltin Dilaurate | 0.17 | 0.17 | 0.17 | 0.17 | 0.17 | 0.17 | 0.17 | 0.17 | 0.17 | 0.17 |
| 25/75 (MIBK[2]/toluene) | 57.05 | 52.77 | 51.7 | 49.92 | 48.49 | 46.35 | 42.78 | 18.83 | 14.27 | — |
| Wt Ratio Prepolymer/Silane | 10/0 | 10/1 | 8/1 | 6/1 | 5/1 | 4/1 | 3/1 | 2/1 | 1/1 | 1/1.5 |
| Molar Ratio NCO/Silane | 10/0 | 3.37/1 | 2.7/1 | 2.0/1 | 1.69/1 | 1.35/1 | 1.0/1.0 | 0.675/1.0 | 0.34/1.0 | 0.23/1.0 |
| Curing time (mins) | 240 | 150 | 150 | 120 | 120 | 120 | 120 | 120 | 360 | 360 |

Footnotes:
[1] Prepolymer designations refer to previously described prepolymer solutions.
[2] Methyl isobutyl ketone

TABLE IV

| Example No. | PHYSICAL PROPERTIES | | | | | | | | | |
|---|---|---|---|---|---|---|---|---|---|---|
| | 17 | 18 | 19 | 20 | 21 | 22 | 23 | 24 | 25 | 26 |
| PENCIL HARDNESS | | | | | | | | | | |
| 24 hours | <H | H | 2H | 2H | 2H | 3H | 3H | 3H | <H | <H |
| 1 Week | 2H | 3H | 4H | 4H | 5H | 5H | 6H | 3H | H | <H |
| STAIN RESISTANCE RATING | | | | | | | | | | |
| $C_2H_5OH$ Resistance[1,2] | | | | | | | | | | |
| 80% | 4.0;2.5 | 3.5;3.5 | 3.5;4.5 | 4.0;5.0 | 2.5;5.0 | 3.0;4.5 | 5.0;5.0 | 5.0;5.0 | 3.5;4.0 | 2.0;2.0 |
| 70% | 3.0;3.0 | 4.0;3.5 | 3.0;3.5 | 4.5;4.5 | 4.0;5.0 | 3.0;5.0 | 5.0;5.0 | 5.0;5.0 | 4.0;4.5 | 2.0;3.0 |
| 60% | 3.5;3.0 | 4.5;3.5 | 4.0;3.5 | 5.0;5.0 | 5.0;5.0 | 5.0;5.0 | 5.0;5.0 | 5.0;5.0 | 5.0;4.5 | 1.5;2.0 |
| Fingernail Polish[1,2] | 3.0;4.0 | 4.5;3.0 | 5.0;4.0 | 5.0;5.0 | 5.0;5.0 | 5.0;5.0 | 5.0;5.0 | 4.5;4.5 | 4.5;4.5 | 4.0;4.0 |
| Permanent Marking[1,2] | 3.5;1.5 | 3.5;1.5 | 3.0;2.0 | 4.0;5.0 | 3.0;4.5 | 4.0;4.0 | 5.0;5.0 | 4.5;4.5 | 3.4;3.5 | 2.0;3.0 |
| Black shoe polish[2,3] | 4.0;3.0 | 4.0;2.0 | 4.5;4.5 | 4.5;5.0 | 4.5;4.5 | 5.0;4.5 | 5.0;5.0 | 5.0;5.0 | 3.5;4.0 | 3.0;3.0 |

TABLE IV-continued

PHYSICAL PROPERTIES

| Example No. | 17 | 18 | 19 | 20 | 21 | 22 | 23 | 24 | 25 | 26 |
|---|---|---|---|---|---|---|---|---|---|---|
| Heat resistance[1] | 3.5 | 3.5 | 5.0 | 5.0 | 5.0 | 5.0 | 5.0 | 5.0 | 3.0 | 2.0 |

Footnotes:
[1] coating applied to maple solid wood panels, two coats with a brush, to provide a dry coating thickness of about 75 ± 5 micrometers.
[2] coating applied to laminated veneer oak panels, two coats with a brush, to provide a dry coating thickness of about 50 to 90 micrometers. When Footnotes 1 and 2 are shown together, this means that, with respect to the number pair given for each example, the first footnote applies only to the first listed number and the second footnote applies to the second listed number.
[3] first listed number refers to results obtained by removal of stains by conventional acetone or fingernail polish remover, and second listed number refers to results obtained by removal of stains with mineral spirits.

EXAMPLES 27

This example compares the performance of commercially available coating products with the coating of Example 3, a coating composition of the invention. The penetration is determined by two factors — "spread" and "absorption". Spread is the ability of a one ml volume of a test coating composition to spread on a pine surface before it dries. Absorption measures the height of a test coating carried vertically up an oak column (1 inch in diameter) 10 seconds after the column is placed end wise in a container of the test coating composition. The larger the spead area and the higher the height reached on the column, the better the penetration into wood. The product of the invention was found to be superior to the commercially available products in all categories. The comparison of properties is shown in Table V.

tions exhibit excellent bonding and adhesion to ceramic and concrete surfaces, providing excellent abrasion resistance and moisture resistance. The filled composition may be employed as grout for ceramic tile or as a waterproof coating for basement walls and floors.

Examples 30 and 31 provide compositions which include silica filler to reduce gloss from an initial reading of about 80 to 90 gloss units to about 30 to 35 units as determined using Gardner glossmeter at a 60° angle.

While this invention has been described in terms of specific embodiments, it should be understood that it is capable of further modifications. The claims herein are intended to cover those variations which one skilled in the art would recognize as the chemical equivalent of what has been described here.

I claim:
1. One-part moisture-curable polyurethane composi-

TABLE V

| Coating Composition Type (Supplier) | Solids % | Time to Dry to Recoat (min.) | Pencil Hardness | Stain Rating Alcohol 90% | Stain Rating Alcohol 80% | Finger-nail Polish | Permanent marker | Shoe polish | Heat Resistance Rating | Penetration spread (sq. in.) | Penetration absorbtion (in.) |
|---|---|---|---|---|---|---|---|---|---|---|---|
| Nitrocellulose (Lilly) | 44 | 2 | 2-3 H | 2.0 | 2.0 | 1.0 | 1.0 | 1.0 | 1.0 | 1.5 | 1/4 |
| Nitrocellulose (Sherwin Williams) | 38 | 2 | 2-3 H | 2.5 | 3.0 | 1.0 | 1.0 | 2.0 | 2.0 | 1.25 | 1/16 |
| Tung oil (Hope) | 100 | 48 | <H | 3.5 | 4.0 | 2.0 | 1.0 | 3.0 | 2.0 | 11.25 | 3/8 |
| Alkyl varnish (Homer Formby) | 23 | 12 | H | 2.0 | 2.5 | 3.5 | 1.0 | 1.0 | 4.0 | 6.25 | 1/4 |
| Alkyl urethane (Homer Formby) | 21 | 12 | H | 2.0 | 2.0 | 4.0 | 1.0 | 1.0 | 4.0 | 8.75 | 1/4 |
| Shallac (Bulls Eye) | 30 | 24 | H | 1.0 | 1.0 | 1.0 | 1.0 | 1.0 | 1.0 | 2.25 | 1/16 |
| Urethane, glass (Minwax) | 45 | >8 | H | 1.0 | 1.0 | 2.0 | 2.0 | 1.0 | 2.0 | 7.50 | 1/4 |
| Urethane, satin (Minwax) | 42 | >8 | H | 3.0 | 3.0 | 3.0 | 3.0 | 2.0 | 1.0 | 5.75 | 1/4 |
| Urethane, gloss (DEFT) | 55 | 6 | H | 4.5 | 4.5 | 3.0 | 1.0 | 1.0 | 1.0 | 2.75 | 1/16 |
| Urethane, satin (DEFT) | 55 | 6 | H | 3.5 | 3.5 | 1.0 | 1.0 | 1.0 | 4.0 | 3.0 | 1/16 |
| Urethane, gloss (McClosky) | 42 | 8-24 | H | 4.5 | 4.5 | 1.0 | 1.0 | 1.0 | 1.0 | 3.0 | 1/16 |
| Urethane, satin (McClosky) | 38 | 8-24 | <H | 4.5 | 4.5 | 1.0 | 4.0 | 1.0 | 1.0 | 3.25 | 1/16 |
| Urethane (Red Devil) | 20 | 24 | 3H | 3.5 | 3.5 | 2.0 | 2.0 | 4.0 | 3 | 2.5 | 1/4 |
| Urethane, (Woodsman) | 23 | 24 | H | 4.0 | 4.0 | 2.0 | 2.0 | 4.0 | 4 | 3.0 | 1/4 |
| Example 3 | 40 | 2-3 | 4H | 5.0 | 5.0 | 5.0 | 5.0 | 5.0 | 5.0 | 12.0 | 1 1/2 |

EXAMPLES 24–31

Examples 28–31 show the use of different additives incorporated into coating formulations according to the invention for different purposes.

| Ingredients (Parts) | Example No. 28 | 29 | 30 | 31 |
|---|---|---|---|---|
| Prepolymer Solution A | 63 | 63 | 63 | 63 |
| gamma-glycydoxy propyl trimethoxysilane | 31.5 | 63 | 21 | 21 |
| dibutyltin dilaurate | 0.2 | 0.2 | 0.25 | 0.25 |
| 25/75 (MIBK/toluene) | — | — | 63 | 63 |
| ZnS | 30 | | | |
| TiO2 | | 40 | | |
| Silica HP-200 | | | 4.5 | |
| Silica HP-210 | | | | 4.5 |

HP-200 and HP-210 are the manufacturer's designations for silica fillers which are available from Crossfield Chemicals in Pittsburgh, Pa.

Formula 28 and 29 are filled compositions that can be applied as grout to cement block. The cured composition, consisting essentially of triisocyanate prepolymer, an amount of an epoxy silane compund effective to crosslink said prepolymer and sufficient compatible liquid vehicle to make the composition suitable for application, said epoxy silane compund being sufficiently free of active hydrogen-containing functional groups to avoid premature gelation of the prepolymer when combined therewith.

2. The composition of claim 1 wherein said triisocyanate prepolymer is a reaction product of a diisocyanate with a member selected from the group consisting of a triol and 1,3,5-triazine.

3. The composition of claim 2 wherein said diisocyanate is selected from the group conisting of aromatic and aliphatic diisocyanates.

4. The composition of claim 1 wherein said epoxy silane is selected from the group consisting of gamma glycidoxypropyltrimethoxy silane and beta-(3,4-epoxycyclohexyl)ethyltrimethyloxy silane.

5. The composition of claim 1 wherein said composition having a stable shelf life also includes sufficient flattening agent to reduce gloss.

6. One-part moisture-curable polyurethane composition, consisting essentially of triisocyanate prepolymer, a sufficient amount of diisocyanate prepolymer to improve the flexibility of the cured composition, an amount of an epoxy silane compund effective to crosslink said prepolymers and sufficient compatible liquid vehicle to make the composition suitable for application, said epoxy silane compound being sufficiently free of active hydrogen-containing functional groups to avoid premature gelation of the prepolymers when combined therewith.

* * * * *

UNITED STATES PATENT AND TRADEMARK OFFICE
CERTIFICATE OF CORRECTION

PATENT NO. : 4,839,455

DATED : JUNE 13, 1989

INVENTOR(S) : JAMES J. FONG

It is certified that error appears in the above-identified patent and that said Letters Patent is hereby corrected as shown below:

Col. 1, line 9, "substrate" should be --substrates--.
Col. 1, line 12, "thoughness," should be --toughness,--.
Col. 1, line 15, "genrally" should be --generally--.
Col. 1, line 43, "celluose" should be --cellulose--.
Col. 1, line 52, "polysocyanate" should be --polyisocyanate--.
Col. 1, line 57, "socyanate" should be --isocyanate--.
Col. 2, line 19, "aphliphatic," should be --aliphatic,--.
Col. 3, line 61, "fo silane" should be --of silane--.
Col. 4, lines 14-15, "penataerythriotol," should be --pentaerythritol,--.
Col. 4, line 21, "2,4, toluene" should be --2,4,toluene--.
Col. 4, line 66, "structure" should be --structures--.
Col. 5, line 27, "rection" should be --reaction--.
Col. 5, line 62, "prppyl" should be --propyl--.
Col. 7, line 44, "oxigen" should be --oxygen--.
Col. 7, line 64, "oxigen" should be --oxygen--.
Col. 8, line 2, "cyclopentyle," should be --cyclopentylene,--.
Col. 8, lines 6-7, "hyydrocarbon" should be --hydrocarbon--.
Col. 8, line 8, "ispropyl," should be --isopropyl,--.

UNITED STATES PATENT AND TRADEMARK OFFICE
CERTIFICATE OF CORRECTION

Page 2 of 3

PATENT NO. : 4,839,455

DATED : JUNE 13, 1989

INVENTOR(S) : JAMES J. FONG

It is certified that error appears in the above-identified patent and that said Letters Patent is hereby corrected as shown below:

Col. 8, line 26, "fo" should be --of--.

Col. 8, line 34, "bis[2-(2-N,N -dialkylamino)-alkyl]" should be --bis[2-(N-N-dialkylamino)-alkyl]--.

Col. 8, line 35, "kialkyl" should be --dialkyl--.

Col. 8, line 56, "or" should be --for--.

Col. 8, line 63, "sucha" should be --such--.

Col. 9, line 16, "-polythylene" should be --polyethylene--.

Col. 9, line 29, "14 15" should be --1-15--.

Col. 9, line 34, "prepolymer" should be --prepolymers--.

Col. 9, line 47, "concetraion" should be --concentration--.

Col. 10, line 18, "eith" should be --with--.

Col. 10, line 27, "priot" should be --prior--.

Col. 10, line 29, "thest" should be --test--.

Col. 10, line 29, "2 3/4" should be --2 3/4 inch--.

Col. 10, line 46, "accordding" should be --according--.

UNITED STATES PATENT AND TRADEMARK OFFICE
CERTIFICATE OF CORRECTION

Page 3 of 3

PATENT NO. : 4,839,455
DATED : JUNE 13, 1989
INVENTOR(S) : JAMES J. FONG

It is certified that error appears in the above-identified patent and that said Letters Patent is hereby corrected as shown below:

Col. 11, line 32, "one-componet" should be --one-component--.
Col. 11, line 39, "60°C." should be --60°C--.
Col. 12, line 36, "shwon" should be --shown--.
Col. 13, line 22, "spead" should be --spread--.
Col. 14, line 51, "compund" should be --compound--.
Col. 14, line 54, "compund" should be --compound--.

Signed and Sealed this

Sixteenth Day of July, 1991

Attest:

HARRY F. MANBECK, JR.

Attesting Officer      Commissioner of Patents and Trademarks